(12) United States Patent
Dillon et al.

(10) Patent No.: US 9,751,671 B2
(45) Date of Patent: *Sep. 5, 2017

(54) CIRCUMFERENTIALLY BOUND STRUCTURAL TRANSIT PACKAGE

(76) Inventors: Ralph L. Dillon, Mundelein, IL (US); Joseph F. Noferi, Lincolnwood, IL (US); Douglas W. Eggins, Barrie (CA)

(*) Notice: Subject to any disclaimer, the term of this patent is extended or adjusted under 35 U.S.C. 154(b) by 929 days.

This patent is subject to a terminal disclaimer.

(21) Appl. No.: 12/453,379

(22) Filed: May 8, 2009

(65) Prior Publication Data

US 2009/0261008 A1 Oct. 22, 2009

Related U.S. Application Data

(63) Continuation-in-part of application No. 11/594,187, filed on Nov. 8, 2006, now abandoned, which is a
(Continued)

(51) Int. Cl.
*B65D 71/14* (2006.01)
*B65D 71/16* (2006.01)
(Continued)

(52) U.S. Cl.
CPC ............. *B65D 71/14* (2013.01); *B65D 71/26* (2013.01); *B65D 71/30* (2013.01); *B65D 71/38* (2013.01); *B65D 2571/0024* (2013.01); *B65D 2571/0029* (2013.01); *B65D 2571/0032* (2013.01); *B65D 2571/0045* (2013.01); *B65D 2571/0066* (2013.01); *B65D 2571/00141* (2013.01); *B65D 2571/00327* (2013.01); *B65D 2571/00339* (2013.01); *B65D 2571/00481* (2013.01); *B65D 2571/00666* (2013.01); *B65D 2571/00716* (2013.01); *Y02W 90/11* (2015.05)

(58) Field of Classification Search
CPC ........ B65D 71/14; B65D 71/16; B65D 71/26; B65D 71/30; B65D 71/38; B65D 2571/00716
USPC ..... 206/427, 434, 451, 150, 140; 229/87.01, 229/87.04
See application file for complete search history.

(56) References Cited

U.S. PATENT DOCUMENTS 2,313,731 A * 3/1943 Brogden .................. 206/163
2,908,121 A * 10/1959 Enos, Jr. ................... 53/399
(Continued)

FOREIGN PATENT DOCUMENTS

DE 3811473 A1 * 10/1989
EP 0093302 A2 * 11/1983

*Primary Examiner* — Anthony Stashick
*Assistant Examiner* — Blaine Neway

(57) ABSTRACT

Containerized goods are packaged for transit using a partial or fully circumferential wrapper about which a tensioned-strap is secured, to form an integrated structural package that facilities rapid loading of a machine magazine or picking platform such as a shelf with pre-oriented articles as well as shipping the units palletized in several tiers for distribution and display. The wrapper may be of sheet wood-fiber origin or other materials, the open wrapper ends permitting clear display of the goods labels. D-cuts into the wrapper provide displaceable tabs, for locating and/or separating the adjoining containers, and further integrating the wrapper with its contents, when strapped to form transit packages, able to withstand the rigors of palletized transit.

14 Claims, 6 Drawing Sheets

Related U.S. Application Data continuation-in-part of application No. 11/082,984, filed on Mar. 18, 2005, now abandoned.

(51) Int. Cl.
    *B65D 71/26*     (2006.01)
    *B65D 71/30*     (2006.01)
    *B65D 71/38*     (2006.01)

(56) References Cited

U.S. PATENT DOCUMENTS

| | | | | |
|---|---|---|---|---|
| 3,656,614 | A | * | 4/1972 | Jacobson ................ 206/431 |
| 4,079,566 | A | * | 3/1978 | Stoecklin ................ 53/399 |
| 4,471,870 | A | * | 9/1984 | Uhlig ................ 206/150 |
| 4,609,143 | A | * | 9/1986 | Collura et al. ................ 229/183 |
| 4,796,754 | A | * | 1/1989 | Chaussadas et al. ........ 206/434 |
| 4,930,633 | A | * | 6/1990 | Gloyer ................ 206/428 |
| 5,607,056 | A | * | 3/1997 | Whiteside ................ 206/427 |
| 5,782,343 | A | * | 7/1998 | Harrelson ................ 206/140 |
| 6,039,181 | A | * | 3/2000 | Whiteside ................ 206/428 |

\* cited by examiner

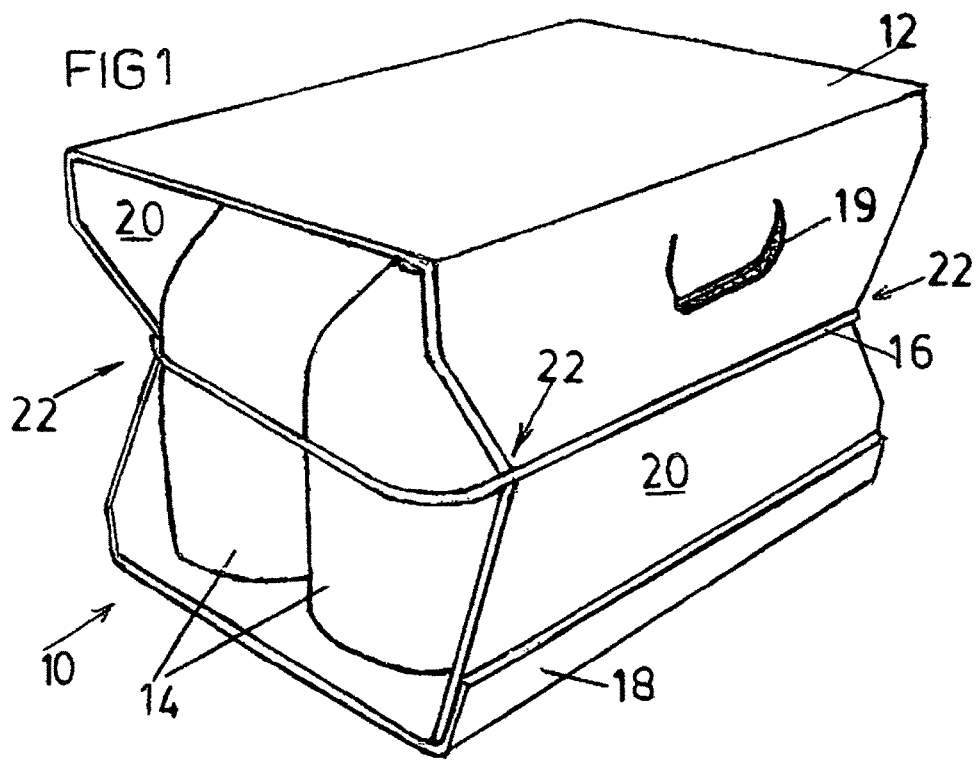
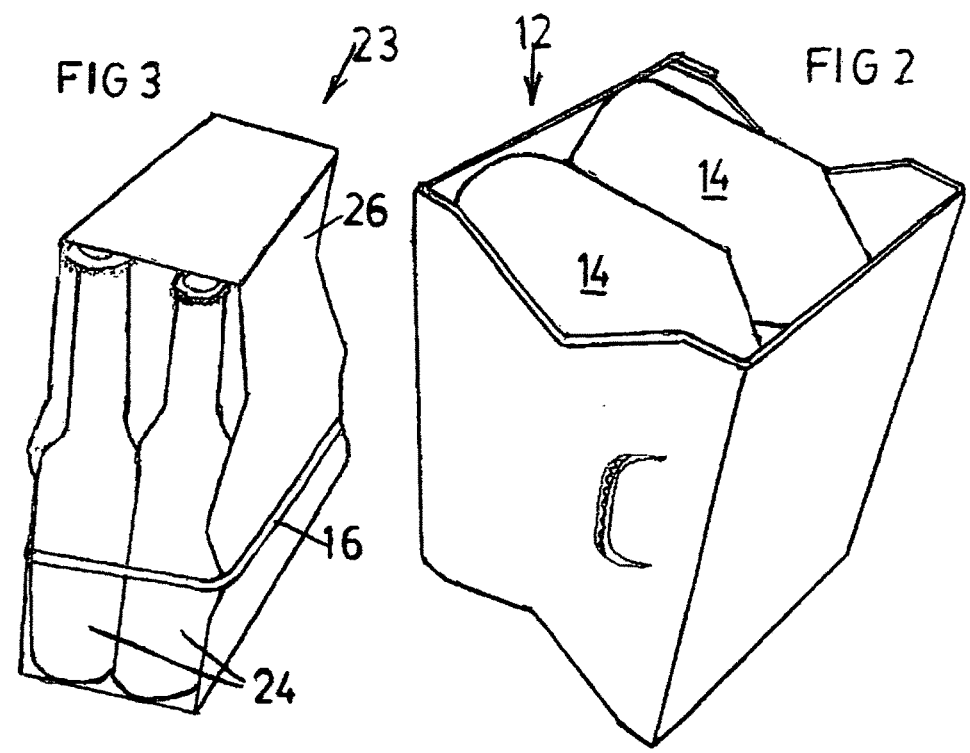

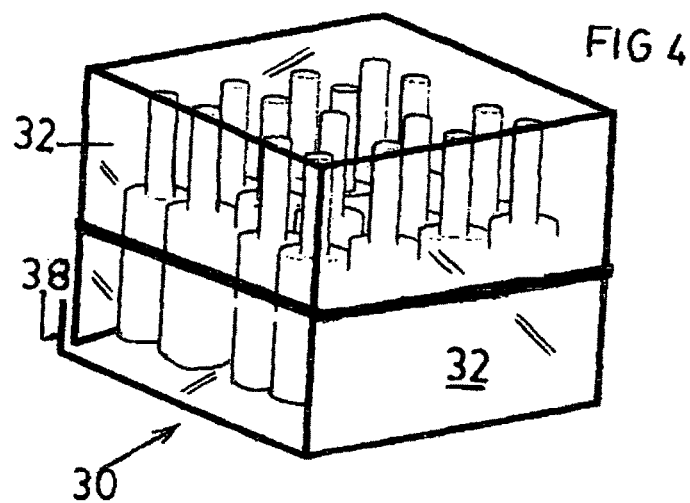
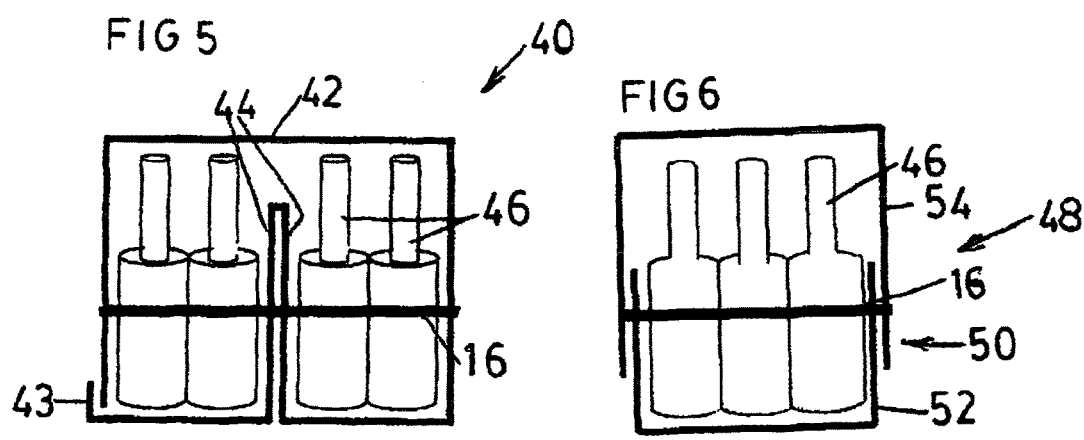
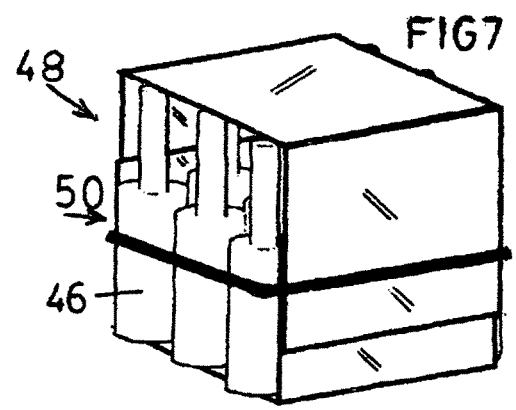

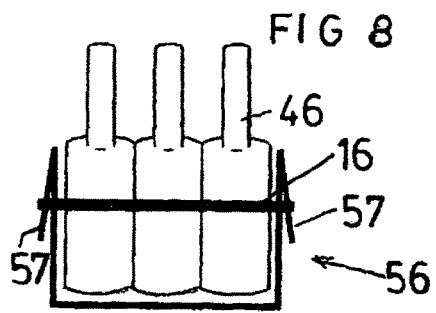
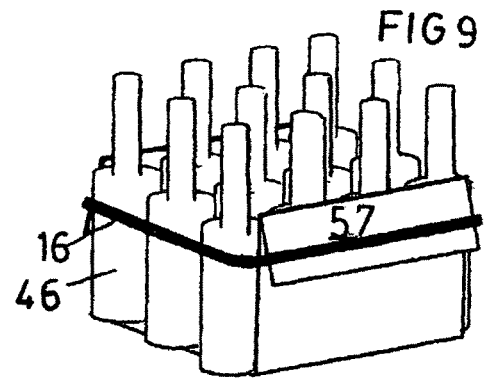
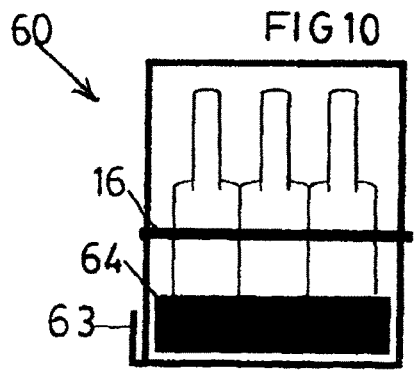
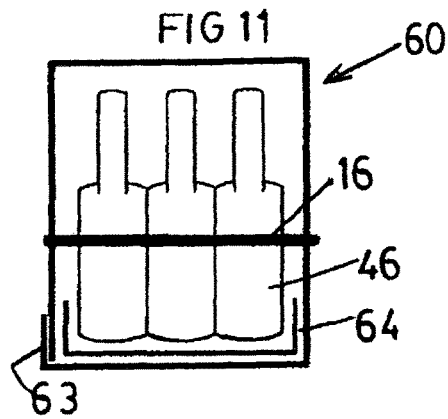
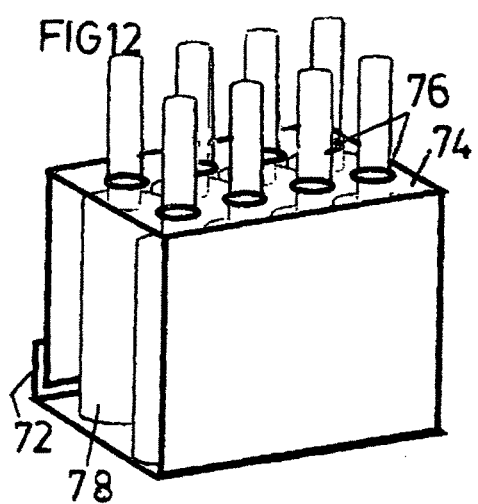
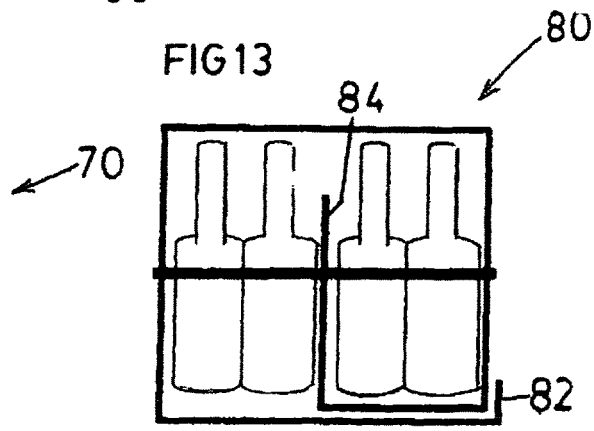

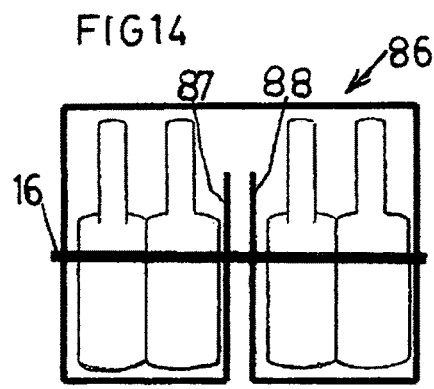
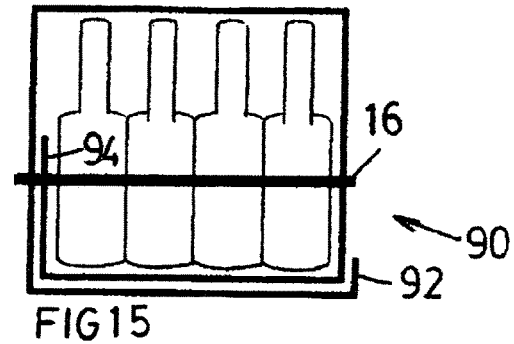
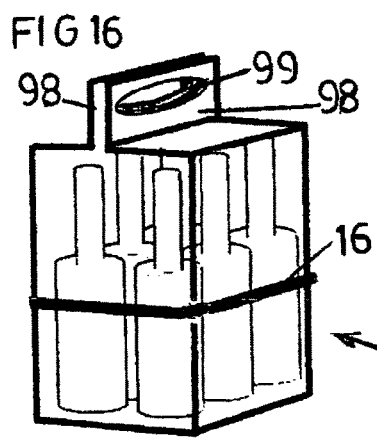
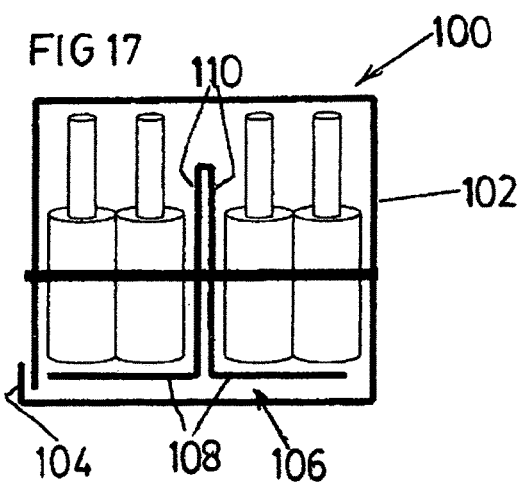
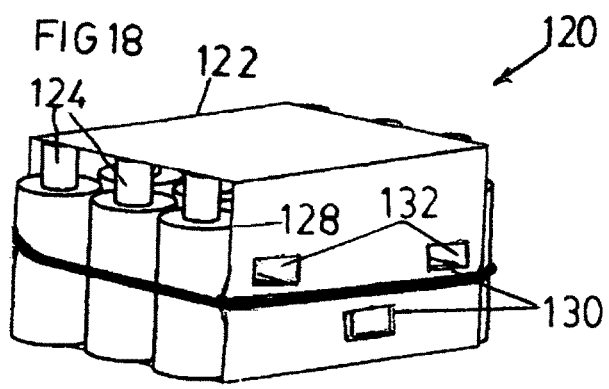

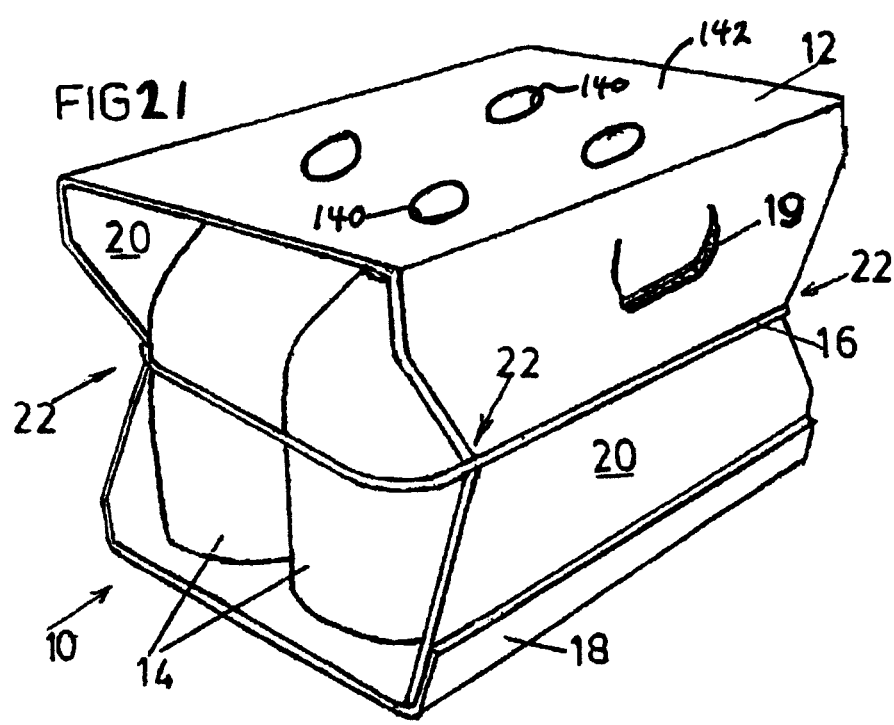

CIRCUMFERENTIALLY BOUND STRUCTURAL TRANSIT PACKAGE

CROSS-REFERENCE TO RELATED APPLICATIONS

This application is a Continuation-in-Part of application Ser. No. 11/594,187 filed Nov. 8, 2006 now abandoned, which is a Continuation-in-Part of application Ser. No. 11/082,984, filed Mar. 18, 2005 now abandoned.

BACKGROUND OF THE INVENTION

1. This invention is directed to a high efficiency composite structural strap-reinforced paperboard transit package, and to its method of use. The low-cost structural package assemblies are suited to rapid loading into a machine magazine or onto picking platforms such as shelves, with the package contents pre-oriented for identification and shelf display purposes, as well as being suited for multi-layer transit palletizing.

2. Paperboard packaging is extensively used throughout the world for the transportation and display of goods. Although universally accepted, current paperboard packaging practice for transit packaging relies primarily on the inherent strength and contrived rigidity of the paperhnard construct per se, and fails to incorporate the strength and load-bearing values of the other components of the total package, including its contents, into coordinated, integrated and structurally engineered composite package units suited for multi-tiered pallet transportable loads.

The packaging industry currently relies primarily on the structural strength and rigidity of an exterior carton within which goods are contained, for purposes of pallet load stability.

The current transit package paradigm requires a paperboard box structure of undue strength and rigidity, with correspondingly high paperboard and glue content, especially when packages are designed for pallet display (e.g., The Bliss Box where articles are loosely packed within containers of substantial center walls as well as heavily reinforced sides and corners, that allow open fronts and tops from which consumers can pick the goods), which box, because of excessive structure and glue does not lend itself to reuse or recycling, or to easy knock down and flattening for re-use of the boxes.

Such profligate use of materials, especially paperboard, contributes significantly to the generation of greenhouse gases and global warming, to the de-nuding of forests, and the consumption of clean water resources. It is estimated that a one ton reduction in corrugate production results in a one ton reduction of $CO_2$ emissions, preserves 12 mature trees and saves 17 thousand gallons of fresh water.

A further adverse consequence of current packaging practice, wherein the contained goods units are not mutually secured to themselves or to the package, is that relative movement and fretting between adjacent containers can occur within the package, which can translate, under transit forces, into potential goods damage resulting from mutual impact with adjacent goods within such packages, and the application of cumulative shift-momentum transferred from the goods to the containing transit package.

Briefly reviewing the systems necessary to implement packaging of earlier (patented) package formats using components visually similar to those of the present invention:

Daniel (U.S. Pat. No. 5,653,340) requires pre-strapping of articles, then mechanically conforming the position of articles to avoid nesting before putting them through a wrap-around paperboard machine. This requires a wrap around paperboard machine capable of making the Daniel package, with the capability of machine changeovers from one size or type of package to another. In addition to providing a system to load the goods into the paperboard blank, there must also be provided a means for the strap to engage a flap of the paperboard carton. Furthermore, when the package has arrived at it's dispensing location, the involved flap impedes the desired release of the entrained articles after the strap is severed by some means.

The Whiteside chime lock Application (Ser. No. 11/082, 984 filed Mar. 18, 2005), in implementation, requires wrap around fabrication of the sleeve or alternatively tip-in individual container erection, so it is functionally limited to hand samples, or requires the use of wrap around equipment, which significantly raises the capital investment required. Additionally, with chime locks, there is a demonstrated problem in that the carton can pop off some percentage of some types of container lids during disassembly of the carton.

The fact that this Whiteside paperboard configuration with strap configuration works with a single strap makes it more valuable than a dual banded configuration because it reduces the quantity of strap material, requires less strapping cycle time and achieves greater productivity, affording faster return on investment for capital equipment.

Many prior art packaging concepts for 'point of purchase' packages have included the use of stretchable bands to wrap about a package. In the case of the Hi-Cone™ product the polyethylene band, as with the rubber bands used with other such products, are all subject to stretching, rendering the packaging inappropriate for use in transit packaging. Such forms of securement are unable to withstand the rigors of transit packaging, and require supplementation with additional constructs such as a box, a shrink wrap tray, or particularized handling provisions, to counter the degradation in structural strength when transit stressed, associated with their 'elastic' design. Such elastic banding also does not readily lend itself to rapid disconnection without the provision of a tear-away notch or perforation of the band, which provision further weakens an unprotected band, that can readily sever, unless protected by other means.

Although a plethora of point of purchase package designs with stretchable bands have been patented over the past century, previously patented banded package configurations have not been successful in transit applications because they typically have not stood up to the rigors of general transit unless they were supplemented with additional constructs such as a box, shrink wrap tray or have been given special handling considerations to counter the inherent elasticity of their design which can lead to degraded structural strength when stressed. Additionally these bands cannot be quickly disconnected without the addition of a tear away notch or perforation both of which further weakens the tension strength of the band which may come apart in transit if not protected.

Suitability of packaging for general transit applications is typically proven by passing standard tests that are performed in most packaging laboratories before manufacturers will accept designs for use and before liability insurance carriers will cover shipments. These tests include but are not limited to Drop tests such as ASTM # D5276
Vibration tests such as ASTM # D4728
Compressive loading tests such as ASTM # D642

Transit packages used by the US government must comply with 49 C.F.R. Subpart M—"Testing of Non-bulk Packaging and Packages" which specifically calls for the above testing. This regulation was last amended in 1993 and the legislative discussion supporting the regulation appears to have been entirely based on the presumption of the use solely of boxes and cartons for transport (transit) packaging, as being the only feasible way to meet the then current test requirements, because previous multi-packs other than boxes and cartons could not meet the required rigorous testing standards.

Corrugate manufacturers routinely dismiss any discussion of banded packages for use as transit packaging on the basis of the packages' inability to pass generally accepted testing requirements.

When a transit package reaches it's dispensing destination, typically the package must be opened and hand loaded into the dispensing magazine or shelf with great care by the unloading person to maintain or provide proper article orientation. Consequently, any packaging that simplifies this loading represents value in labor savings and operational consistency.

Additionally, it is typical for a commercial manufacturer of goods to have two distinct transit package configurations, with the associated administrative overhead of separate SKUs (Stock Keeping Units). Typically one package configuration is required for special handling channels such as club stores; and a second, box/tray for normal channels where less than full pallet loads are shipped. This circumstance also includes (as well as) the operational burden of running separate packaging lines for each configuration. The special handling channel, because it disrupts standard operations, typically results in greater costs to produce those multi-packs even though they usually is marketed for a lower per unit price.

The long felt need for a multipack transit system that could be used in both channels is clearly evident.

Consequently, a multipack transit system that could be used in both channels provides manufacturing and distribution synergies making it particularly desirable.

BRIEF SUMMARY OF THE INVENTION

The present invention provides a integrated composite structural transit package assembly of significantly reduced package materiel content, and utilizing structural engineering principles in combining the structural strength of the package goods content within the structure of the package per se to build an integrated unit. Circumferential binding of the subject package and its contained goods within a circumferential strap loaded to a predetermined tension, serves to compress the package components and wares into an integrated, stable, structural unit. Thus, the package assembly becomes a synergistic, load sustaining unit that can be arranged in layers upon pallets. Pallet loads can be comprised of a single uniform product or mixed, multi-product loads for storage, shipping and distribution throughout the supply chain. The arrangement with a tensioned circumferential strap allows for compression to be set sufficiently tight that it:

precludes vibrational coupling/decoupling impact of articles within package;
precludes spin and adjacent goods or package contact scuffing; and,
enhances the strength of the composite package through cross supporting conjoined arrangement of internal articles and simultaneous absorption of applied forces that are typical to packages in transit.

Strap is herein defined as a pliant linear strip material of one or more strands, of significant toughness that may be collectively tensioned to a predetermined load, and does not significantly stretch or creep under transit load conditions. The term "creep" has the understood engineering meaning— 'to change shape permanently when subjected to prolonged stress under working conditions' i.e. transit load conditions.

In contrast to prior art use of elastic bindings, strap as defined above and used in the present invention does not significantly stretch or creep when subjected to transit load conditions. Therefore, packages incorporating such strap material and constructed in accordance with the principles of this application, remains sound and integral through typical transit stresses imparted by standard commercial distribution.

Embodiments of the subject transit packaging, referred to as Reduced Format Transit Package (RFTP) provide visual access to the goods within the package, which renders the composite assembly particularly appropriate for goods display.

Critical to successful transit packages is the ability to be handled without damage under general transit conditions. Test requirements for transit packages under typical handling conditions are defined similarly by Military specifications, Government procurement requirements and industry standards.

Achievement of these required military, government and industry package standards is verified by standardized tests, typically the drop test, the vibrational test, and the compressive loading test.

In these three critical tests, a subject RFTP circumferentially bound structural transit package, although not a box, has been found to meet and even exceed the industry standards set forth for a traditional box containing similar assemblies of articles.

The achievement of this important qualification strongly supports the merits of the present invention.

The RFTP package succeeds because, unlike other elastically-banded packages, its circumferential strap is resilient yet effectively inelastic, giving packagers the ability to control the tightness or tension of the strap when it is set about the assembly to provide a package integrating force that exceeds the momentary impact destructive forces of a drop test.

Commercial polymeric strap such as that used with the subject RFTP packages can be tensioned to forces as high as 4000 lbs with current commercial technology. In contrast, prior art boxes have relied on the structural strength of their walls, which often experience lateral distortion when interior goods shift. Such distortion seriously imperils the load-bearing capacity of the affected box, which becomes susceptible to crushing failure, due to walls buckling under load.

The drop test impact force on an RFTP package (always made from a standard reasonable height) may be calculated as "Force equals the package mass (M) times the acceleration (A) (F=M×A" where mass (M) is the package weight and acceleration (A) is a the gravitational acceleration of 9.8 meters per sec per sec over the known height). The binding force of the subject circumferential strap prevents rupture of the package, by securely maintaining the components in their conjoined relationship during the impact.

Due to the integrated structure of the circumferential-strap package binding, the impact-generated force is transmitted through and absorbed by the entire mass of the integrated package, while the immobilization of the package internal contents precludes the generation of additive stress that could otherwise arise from interior impact forces generated by relative motion between disconnected interior articles.

In the vibration test of an RPTF package, the pre-set tightness of the strap precludes article-to-article chiming. Such chiming in the case of glass containers, causes micro cracks that propagate, causing container breakage in prior art packages, with a subsequent associated cascade of failure that the void left by a broken container can initiate. In transit packages that are elastic band or loose band dependant, the force provided by the band is ineffective in preventing such chiming.

Finally in the compressive test, the strong effectively inelastic nature of the circumferential strap tensioned about the containers and the paperboard, contains bulging of (elastic) flexible containers, so that the containers cannot deform beyond the intended package dimensions. The constrained and integrated containers and their compressed contents provide mutual vertical strength to the composite package.

The packages in accordance with the present invention are particularly advantageous because the packaging system used in their manufacture greatly simplifies the packaging process over previously invented packages.

Typically, assembly of the subject "circumferentially bound structural transit package" is accomplished by squared erection of the prefabricated sleeve, sliding insertion of goods or articles into the sleeve, followed by the application of the subject circumferential strapping to the assembly using a strapping machine that automatically adjusts to apply a predetermined tension to the strap, regardless of any variability in the circumference of the subject package. Thus the present system provides significant economic and capital cost advantages as well as real ecological/environmental benefits.

The reduction of outer packaging components used in the present invention, over current transit packages, leaves contents more readily visible for consumer selection and visually more accessible for distributor/retailer inventory purposes.

The addition of a quick disconnect feature for the strap of the present application greatly enhance its commercial viability, as it allows a stock person to open the Multi-pack into it's individual articles without having to resort to the use of the typically used razor, knives or scissors. This simplification makes stocking of the articles safer and more efficient. Also eliminated for the benefit of the retailer is the deconstruction of boxes, shrink wrapped trays and multi-strapped packs of the prior art, and their associated disposals.

The strap quick disconnect feature includes a quick-release, manually operable strap detachment having a digitally accessible free end readily manually disengagable from the package, by pulling loose that free end, to release the strap.

It is contemplated that the strap may include a pre-tied releasable knot, prior to being tensioned. This knot then provides a rapid opening device for releasing the strap and readily undoing the package by hand, without difficulty or recourse to knives or other tools. The pre-tied knot may release two free ends of the strap, or it may release an intermediate length sufficient to free the strap.

The subject sleeve configurations lend themselves to being unfolded or stored flat, and returned in bulk to the originator, with consequent financial savings and ecological benefits.

The strap lends itself to recycling or disposal.

The simplicity of the subject package embodiments of this invention and the manner of their assembly permits the comparatively low cost use of commercially available off-the-shelf equipment mechanisms, which greatly facilitates the widespread adoption by slower speed and smaller volume producers of the subject packaging system, particularly when compared with the forbidding capital equipment financial burden associated with earlier non-boxed multi-pack transit package systems.

At the end of the supply chain, when transit is complete and the package is disassembled, the paperboard sleeve portions of the subject packages have a smaller corrugate footprint to dispose of, and offer the further advantage of being easily flattened for either disposal or redeployment and reuse.

A first embodiment of the present package consists of a paperboard sleeve having a top, sides and bottom, to receive two or more goods containers in mutually adjoining, standing relation within the sleeve, the sleeve being waisted along its sides, and having a tensioned belt applied about the waist in compressive relation with the sleeve and its contents.

The term "hourglass" may be applied to define the waisted appearance of the package with its contents in this embodiment in order to facilitate description. However, it will be understood that the subject invention is not limited to the use of a single waist and its associated circumferential tension member, but may encompass multiples of such an arrangement. Also, the package may be other than a fully enclosed or enclosing sleeve.

In use, the prepared sleeve embodiment is erected, the containerized contents inserted within the sleeve in mutually adjoining standing relationship, in files and/or rows, and the circumferential lateral strap applied, tensioned and secured about the waist.

The articles are preferably oriented having their identifying label information facing outwardly to the open ends of the sleeve, to facilitate product identification while packaged, and to obviate or minimize the need to pre-print the sleeve, thereby minimizing outer package material costs.

Construction may be accomplished by standing the erected sleeve on one end, inserting the subject containers in a lateral position downwardly into the sleeve, also in files and/or rows. The up-ended, filled package assembly is then moved to a vertical strapping machine and the strap applied in tensioned, securing relation about the waist of the sleeve, thereby marrying the sleeve to its contents.

In the construction of the sleeve, the height of the opened sleeve usually conforms to the height of the containers being packaged; while the length of its sides, and top and bottom width conform to the overall dimensions of the assembled contents. Side length may be reduced somewhat in some instances, leaving a slight overhang by the articles/containers of the sleeve front and back edges.

The cut-outs that constitute the four 'corners' of the waist are generally triangular, forming a 'V', such that the apices of the Vees are located at the point of tangent of the sleeve to the walls of the containers, so that the wrapped strap engages an adjoining arc of the surface of the containers as well as the sleeve sides.

It has been observed that the adoption of V'd strap recesses presents a visually more appealing package that in robust handling conditions avoids the unsightly look of random turned edges or torn (rectangular) strap slots that may occur under rough handling. Aesthetic design and trademark identification considerations may, however, result in more rounded, 'U'-shaped cut-outs or more squared, tetrahedral cut-outs.

More importantly, the presence of the recesses for the circumferential strap greatly facilitates the loading of containers into the sleeve, and provides guidance in the application of the strap, so as to enable the use of existing strapping machines in applying and tensioning the strap, at considerable savings in equipment costs.

Likewise, after the package has arrived at it's dispensing location, it has been found that the recesses do not typically have the turned corners associated with notches that are visually unattractive and functionally impede the release of the previously bound articles into their desired position.

The sleeve sides may have impressed handle push-outs, or cut-outs. Also, with a four-or-more container package, the strap itself may serve as a pick up point/handle, at least for sliding the strapped package upon its pallet, when being hand-loaded.

The package contents of the strapped package are accessed by severance of the strap, leaving the sleeve undamaged, for ultimate return and re-use, or for recycling. The sleeve is easily flattened or unwrapped, and requires minimal handling as waste or for re-use or recycling.

Other embodiments of the invention include:
a sleeve of two pieces having a separate top and bottom
a sleeve of channel form, having no top;
a sleeve of channel form, having no bottom;
a sleeve or partial sleeve design with interior conformance panels to enhance maintenance of package component location.
alternative sleeve materials such as plastic sheeting or fiber panels may be substituted for wood-pulp sheet product;
a sleeve having recesses to receive the tops/caps of the packaged containers:
 1) where the sleeve cap-recesses are cut into the sleeve blank to engage the caps/tops;
 2) where the sleeve cap-recesses provide unhindered access to the caps/tops, for purposes of filling the containers in the assembled construct;
a sleeve having D-cuts into the sleeve, for displaceable tabs, for locating and/or separating the adjoining containers, and further integrating the sleeve with its contents, when strapped;

The above-referred to D-cuts are displaceable tabs of D-cut or other form, being referred to generically as 'D-cut', and being sized and located in the surface of the sleeve, such that, when displaced out of the plane of the sleeve material, the tabs serve to contact the surfaces of the goods and to be trapped there when the strap is applied, to integrate the sleeve with the goods, when strapped.

Many of the sleeve configurations offer the advantage of being able to be made ready in it's contiguous form by the printing converting facility and then shipped flat for simple mechanical erection when needed at the packaging facility.

Furthermore when fully assembled the package can allow for exposing of individual article identification, so that special printing of content information is not required.

The subject package constitutes a structural composite, which is sufficiently load bearing to form a monolithic structural unit for transit packaging, as part of a multi-tiered load with either similar goods or mixed goods as typically assembled at distribution points for low volume retailer needs.

The package structures of the present invention also function well when constructed with components of plastic, fiber or other panel materials.

In the present invention the effectively inelastic tension member facilitates the construction of a structural assembly which is applied to multipack packaging assemblies, by circumscribing a combination of formed planar materials and multiple individual articles. The strap can be sufficiently tensioned to create an enwrapping force which causes the assembly to act as a monolithic integrated package structure capable of multi-layer palletizing, able to withstand disruptive transit forces.

(Strap as defined in this application is a pliant linear strip material of significant toughness that does not significantly stretch or creep in transit load conditions)

Strap may be formed from metal strip, polyolefin material strip, plastic strip, fiberglass strip, composite strip material, string, twine, wire, wired paper, tape, bundling ties and physically securable tension members.

The circumferentially bound structural transit package described in the instant application can meet established test requirements.

The present invention provides a composite circumferentially strapped transit package, comprising a circumferential sheet wrapper enwrapping a plurality of mutually ordered articles, such as containers, in a first circumferential direction, and a strap circumferentially enwrapping the articles and at least portions of the wrapper in a second circumferential direction normal to the first circumferential direction; the strap being at a predetermined tension to exert a binding force integrating the package into a unitary, load bearing structure for use as a transit package.

In one embodiment, the wrapper has upwardly extending walls; edge portions of the walls forming corners in conjunction with the aforesaid articles, the corners having inwardly convergent recesses to receive the strap in positioned relation to compress the wrapper and the articles into the unitary structure of a transit package The wrapper of the composite transit package has a right-rectangular form with upwardly extending walls, to enable the wrapper to stand securely on-end, for purposes of inserting the articles within the wrapper, and for applying the strap about the wrapper.

The wrapper of the composite transit package may comprise a one-piece wrapper having four main panels and at least one overlap-panel for attachment to the opposite end of the wrapper, to form a sleeve with a reinforced overlapped portion to the sleeve.

The wrapper of the composite transit package may have multiple panels, including at least two of the panels located in mutually parallel, infolded relation within the package, dividing the articles such as containers into at least two separated groups of articles.

One article of a composite transit package may comprise a multi-pack of smaller articles.

The sheet wrapper of the subject composite transit package may incorporate article stabilizing elements positioned in interengaged relation with the articles, the stabilizing elements being selected from the group consisting of D-cuts, tabs, occlusions, folded ridges, recesses and protrusions.

The composite transit package sheet wrapper may have four side panels to form a sleeve, and at least one further panel located within the sleeve, positioned in contacting, reinforcing relation with at least some of the articles.

The above-noted article stabilizing elements may consist of a plurality of mutually spaced apertures in a panel portion of the wrapper, positioned to receive portions of the articles in entered, engaged relation with the wrapper.

The composite transit package wrapper may have upstanding end panel portions positioned in adjacent facing, mutually reinforcing relation. These upstanding end panel portions may have a handle aperture extending therethrough.

The wrapper of a composite transit package may be of sheet material selected from the group consisting of paper, fiber board, polymeric sheet including polyethylene sheet, and composites comprising laminated sheets of paper, plastics glass fiber, carbon based fiber, and metals.

The strap of the composite transit package is of linear tensionable material selected from the group consisting of metal strip, polyolefin material strip, plastic strip, fiberglass strip, composite strip material, string, twine, wire, wired paper tape, bundling ties and physically securable tension members.

The subject securing strap may include a quick-release, manually operable detachment having a digitally accessible free end readily manually disengageable from the package, by pulling loose the free end.

The wrapper of the composite transit package may comprise at least two separate portions having the respective ends thereof in mutually overlapping relation; the strap overlying the overlapped wrapper portions, in binding relation therewith.

The composite transit package wrapper may have an open cross-section, having two opposed sides and an interconnecting panel extending therebetween.

The composite transit package strap is a first strap; the package having a second strap in supplementary relation to the first strap, and serving as a pickup point/carrying handle for the package.

The wrapper of the composite transit package may have at least one edge of the wrapper sheet reinforced to strengthen the package and to facilitate package handling.

The composite transit package may have a frangible adhesive to secures items selected from the group comprising the articles, the sleeve, and the circumferential strap to adjoining members of the group.

The articles of the composite transit package may consist of open topped containers, the wrapper having article access apertures to provide clear access to the interior of the containers, for transference of containerized material and to enable the transfer of container closure members to and from the containers.

The strap of the composite transit package may have portions of the tensioned strap spaced from adjacent portions of the articles and the wrapper, affording digital access to the strap, to serve as a lift point such as a handle.

BRIEF DESCRIPTION OF THE SEVERAL VIEWS OF THE DRAWINGS

It will be understood that alternative embodiments of the present invention may be derived by persons skilled in the art, which, if lying within the ambit of the present claims form a part of the present invention.

Certain embodiments of the invention are described by way of illustration, without limitation thereto other than as set forth in the accompanying claims, reference being made to the accompanying drawings, wherein:

FIG. 1 is a front/side perspective views of a strapped package with a one-piece wrap enclosing four plastic jugs, in accordance with the present invention;

FIG. 2 shows the package of FIG. 1 in an up-ended, loaded condition prior to being strapped;

FIG. 3 is a front/side perspective of a strapped package with a one-piece wrap, forming a six-pac of long-necked bottles;

FIG. 4 is a front/side perspective of a strapped one piece package with 16 long-necked bottles;

FIG. 5 is a front elevation of a one-piece strapped package with two internal conformance panels;

FIG. 6 a front elevation of a two-piece strapped package with a drop-over sleeve;

FIG. 7 is a front/side perspective view of a variant of the FIG. 6 embodiment;

FIG. 8 is a front elevation of a strapped half sleeve package with down-folded sides;

FIG. 9 is a front/side perspective view of a variant of the FIG. 8 embodiment;

FIG. 10 is a front elevation of a belted one piece package incorporating a full interior tray;

FIG. 11 is a front elevation of a belted one piece package with a one-piece internal tray;

FIG. 12 is front/side perspective of a one-piece belted package with cut-outs for protruding long-necked bottles;

FIG. 13 is a front elevation of a one-piece belted package with an asymmetrical extended interior vertical conformance panel;

FIG. 14 is a front elevation of a one-piece belted package with a pair of symmetrical extended interior conformance panels;

FIG. 15 is a front elevation of a one-piece belted package with an extended asymmetrical double-bottom panel;

FIG. 16 is a front/side perspective of a 6-pac belted package with folded exterior handle flaps;

FIG. 17 is a front elevation of a belted package with a folded central insert;

FIG. 18 is a front/side perspective of a belted one piece 12-pac package of short-neck bottles;

FIG. 21 is a front/side perspective view of a strapped transit package enclosing four open-top articles or containers in accordance with the present invention, showing article access apertures in the top portion of the wrapper that provide access through the wrapper to the interior of the containers for adding material to the containers through the wrapper, and the application of closure members to the containers.

DETAILED DESCRIPTION OF THE INVENTION

Figure 19:
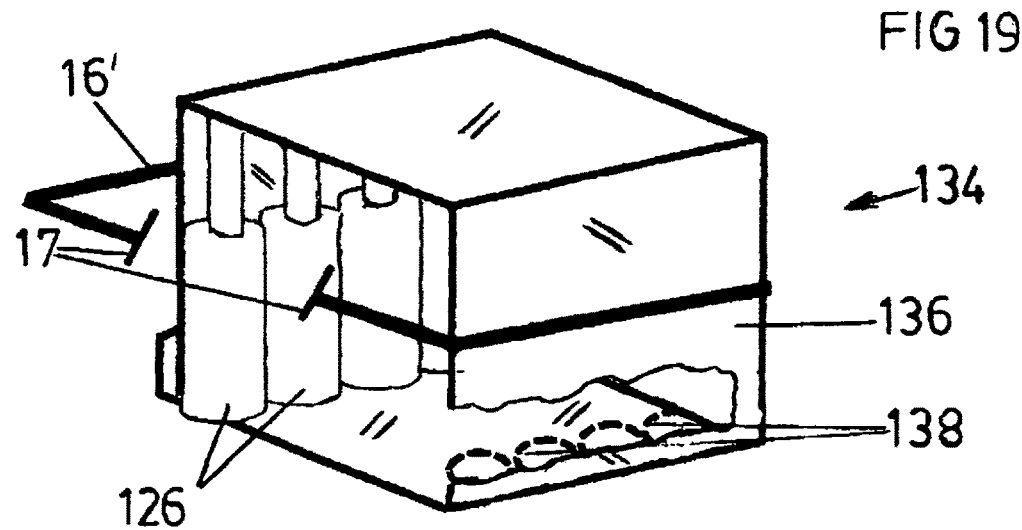
FIG. 19 is similar to FIG. 18, with some bottle contents inserted, and a portion of the wrapper removed to disclose the interior of the package; and, FIG. 20 is a front perspective of a partially filled, belted 12-pac package, with a folded insert and having a portion of the wrapper removed to reveal the interior of the package.

Turning to FIG. 1, a multi-pac package 10 has a one-piece wrapper 12 enclosing four 4-liter jugs 14, and wrapped by a strap 16 of polypropylene. The wrapper 12 has an overlap 18, and sides 20 that are "waisted" at 22 of their side edges, such that the tensioning of stiff-strap 16 engages the edges of the wrapper 12 at the waist 22 and the respective jugs 14, to compress the wrapper 12, jugs 14 and strap 16 into an integrated package entity, capable of supporting a desired load under transit conditions. The overlap 18 may be glued or otherwise fastened to the adjacent side 20, and the wrapper 12 folded flat, prior to usage, or for bulk return purposes. The wrapper 12 shows a handle cut-out 19, one of a pair of such recesses.

FIG. 2 shows the unstrapped wrapper 12 in an intermediate, upended condition, before the application of the strap 16, having been upended in order to facilitate the loading of the jugs 14, shown in their loaded condition within the wrapper 12, prior to being moved to a vertical strapping machine, where the strap 16 is applied at a predetermined high tension, to integrate, and unitize the package 10, reinforcing it by compression to the extent predetermined to meet transit requirements.

FIG. 3 shows a 12-pack, strapped package 23 of long-necked bottles 24 in a one-piece, waisted wrapper 26, bound by a strap 16.

FIG. 4 shows a U-shaped wrapper 30 for long-necked bottles, having two side panels 32, a top and bottom panel 34, 36 and a overlap panel 38, together with a strap 16, tensioned to unify the package to transit capability.

In FIG. 5, the package 40 has a one-piece wrapper 42 with an overlap end panel 43, and a pair of interior fold panels 44 that constitute conformance panels, serving to maintain the internal organization of the contents of package 40. A strap 16 compresses the combined elements of long-necked containers 46 and the wrapper 42 into an integrated transit package.

In FIGS. 6 and 7, a package 48 comprises a two-piece sleeve 50—a lower U-shaped open tray 52 and an inverted U-shaped cap 54, secured by a strap 16 into a compressed, integrated transit package. The sleeve embodiment 50 of FIG. 7 is narrowed, permitting the containers 46 to protrude.

The package 48 is illustrated as containing long-necked containers 46. The vertical capacity of the package 48 can be readily adjusted, owing to the overlap between sleeve 50 and tray 52, the dimensions of which can of course be selectively varied.

FIGS. 8 and 9 portray a one-piece sleeve 56, the ends 57 of which are downturned, and have the strap 16 trained thereabout, in compressive relation. The narrower sleeve 56 of FIG. 9 permits the containers 46 to protrude from its sides.

FIGS. 10 and 11 show package 60 having a one-piece wrap 62 with an overlap panel 63, and an inner U-shaped tray 64, shown oriented at right angles to the wrap 62 in FIG. 10, so that the base of the container contents 66 are fully enclosed. In FIG. 11 the wrap 62 and tray 64 are similarly oriented, to enable end-on loading of the containers 46 A strap 16 secures the package 60.

FIG. 12 shows a one-piece belted package 70 with an overlap 72, the package top panel 74 having cut-outs 76 for protruding necks of long-necked bottles 78. The stacking capacity of this embodiment may be enhanced by the addition of a shallow-sided inverted tray closely fitted to just encompass the tops of the bottles 78.

FIG. 21 shows the multi-pack package 10 of FIG. 1 having a plurality of article-access apertures 140 in top portion 142 of one-piece wrapper 12. Each of the apertures 140 are located directly above the open-tops (not shown) of each container 14. The open tops of the containers provide clear access to the interior of each article or container 14, allowing material to be transferred to each container while the wrapper 12 extends around the containers 14, and strap 16 extends laterally around the wrapper and compresses both the wrapper 12 and the containers 14. Apertures 140 are also large enough to allow the transfer or application of container closure members to and from the containers.

FIG. 13 shows a one-piece strapped package 80 with an attachment panel 82, and an inside conformance panel 84 subdividing the interior. A strap 16 compresses the unit to a desired load capacity.

FIG. 14 shows a one-piece strapped package 86, the ends of which extend upwardly within the package as adjacent conformance panels 87, 88. A strap 16 compresses the unit to a desired load capacity.

In FIG. 15, a one-piece strapped package 90 has an attachment panel 92 and a supplemental end panel 94 that reaches up to approximately the shoulder of the illustrated long-necked bottles, and serves as a conformance panel, while providing a double bottom panel. A strap 16 compresses the unit to a desired load capacity.

In FIG. 16, the one-piece strapped package 96 has its two end panels 98 projecting upwardly to form a handle, with handle apertures 99, and the package united by strap 16 that compresses the unit to a desired load capacity. A slight asymmetry of the handle panels 98 enables them to be folded flat to one side, as part of a palleted transit load.

In FIG. 17 the two-piece strapped package 100 has an outer wrapper 102 with an attachment panel 104. Inserted within the wrapper 102 is a folded loose insert 106 having a pair of out-turned foot portions 108 and an upstanding pair of conformance panels 110. In the oriented position illustrated, before the strap 16 is applied, the wrapper 102 and insert 106 can be up-ended for loading purposes, and the bottles 112 inserted, and the strap 16 then applied. Alternatively, with the attachment panel 104 unsecured, the folded insert 106 may be reoriented at right angles to that illustrated, and the bottles 112 placed on the insert 106, and the package enclosed and strapped.

This reoriented rearrangement provides enhanced lateral stability to the package 100.

FIG. 18 shows a package 120 having a reduced wrapper 122 that extends to cover the caps 124 of the containers 126, and the wrapper edge 128 extends slightly past the centre axis of the row of containers 126 such that tightening of the strap 16 produces a slight wrap of the edges 128 about the containers 126. The outer, bottom edge portions of the containers 126 overhang the bottom front edge of the reduced wrapper 122.

D-cuts 130 having inturned flap portions 132, are illustrated representationally.

FIG. 19 shows a partially filled package 134 with a portion of the wrapper 136 cut away, to reveal the presence of frangible glue patches 138 by which the containers 126 are adhered.

The strap 16' has Tee-ends 17 that are adhered by a coating of frangible glue to a common surface, such as the wrapper 136 or one of the containers 26

Figure 20:
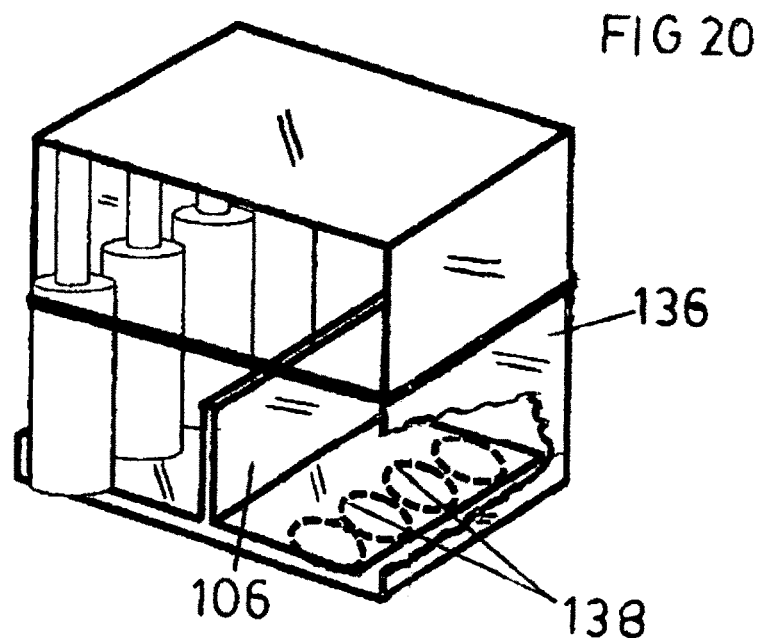

In FIG. 20 the near side of wrapper 136 is cut away to reveal the loose insert 106 which has frangible glue patches 138 by which the containers 126 are adhered. Frangible glue patches may also be used to secure the loose insert 106 to the wrapper 136.

It will be understood that the foregoing embodiments are intended to be illustrative of families of strapped packages, which may be modified in a variety of ways that are evident to those skilled in the art.

The invention claimed is:

1. A composite circumferentially strapped load bearing transit package, comprising:
   a circumferential sheet wrapper continuously enwrapping a plurality of mutually ordered articles in a first circumferential direction, each of said articles positioned within the wrapper in mutually adjoining compressed vertical standing relationship with all adjacent articles;
   said articles each having a predetermined structural strength, said structural strength providing each vertical standing article with a vertical load bearing capability;

an inelastic tensioned strap circumferentially enwrapping said articles and at least portions of said wrapper in a second circumferential direction normal to said first circumferential direction;

said inelastic tensioned strap applying a compressive force to the articles and wrapper in a horizontal direction against all adjacent articles, each article and the wrapper held in an immobile position relative to all articles and said wrapper;

the circumferential sheet wrapper comprising a one-piece sleeve structure continuously circumscribing and in contact with all of the articles, the sleeve structure having four main panels and at least one overlap panel, the overlap panel firmly attached to an opposite panel and forming the sleeve structure, the height of the continuous sleeve structure conforming to the height of the articles positioned in the wrapper;

said compressive force of said inelastic tensioned strap integrating said package and combining the structural strength of the circumferential sheet wrapper, the vertical structural strength capability of each vertical standing article positioned within the wrapper, and the compression applied by said inelastic tensioned strap into a unitary, load bearing structure for use as a transit package; and, said articles retained in a vertical immobile position upon application of transit forces to the transit package.

2. The composite transit package as set forth in claim 1, wherein said wrapper has upwardly extending walls; edge portions of said walls forming corners in conjunction with said articles, said corners having inwardly convergent recesses to receive said inelastic tensioned strap in positioned relation to compress said wrapper and said articles into said unitary structure.

3. The composite transit package as set forth in claim 1, said circumferential wrapper having a right-rectangular form with upwardly extending walls, enabling said wrapper to stand securely on-end, for purpose of inserting said articles within said wrapper, and for applying said inelastic tensioned strap about said wrapper.

4. The composite transit package set forth in claim 1, wherein said one-piece sleeve is positioned in contacting, reinforcing relation with at least some of said articles.

5. The composite transit package as set forth in claim 1, said wrapper having upstanding end panel portions positioned in adjacent facing, mutually reinforcing relation.

6. The composite transit package as set forth in claim 5, said upstanding end panel portions having a handle aperture extending therethrough.

7. The composite transit package as set forth in claim 1, said wrapper being of sheet material selected from the group consisting of paper, fiber board, polymeric sheet including polyethylene sheet, and composites comprising laminated sheets of paper, plastics glass fiber, carbon based fiber, and metals.

8. The composite transit package as set forth in claim 1, wherein said inelastic tensioned strap is of linear tensionable material selected from the group consisting of metal strip, polyolefin material strip, plastic strip, fiberglass strip, composite strip material, string, twine, wire, wired paper tape, bundling ties and physically securable tension members.

9. The composite transit package as set forth in claim 1, wherein said inelastic tensioned strap includes a quick-release, manually operable detachment having a digitally accessible free end readily manually disengageable from said package, by pulling loose said free end.

10. The composite transit package as set forth in claim 1, wherein said inelastic tensioned strap is a first strap; said package having a second inelastic tensioned strap in supplementary relation to said first strap, and said second strap serving as a carrying handle for said package.

11. The composite transit package as set forth in claim 1, wherein a frangible adhesive secures items selected from the group comprising said articles, said wrapper, and said circumferential inelastic tensioned strap, to adjoining members of said group.

12. The composite transit package as set forth in claim 1, wherein said articles comprise open topped containers, said wrapper having article access apertures to provide clear access to the interior of said containers, for transference of containerized material and to enable the transfer of closure members to and from said containers.

13. The composite transit package as set forth in claim 1, wherein:

said articles positioned within the wrapper in mutually adjoining compressed vertical standing relationship include at least a first article stabilizing element positioned in integral relation between a portion of said articles, said stabilizing element being selected from the group consisting of D-cuts, tabs, occlusions, folded ridges, recesses, and protrusions.

14. The composite transit package as set forth in claim 1, wherein:

each of said articles abuts all adjacent articles, said articles retained in said immobile position in abutment with all adjacent articles upon application of transit forces to the transit package.

\* \* \* \* \*